United States Patent [19]

Yuito et al.

[11] Patent Number: 5,212,609
[45] Date of Patent: May 18, 1993

[54] MAGNETORESISTIVE HEAD

[75] Inventors: Isamu Yuito, Oume; Makoto Morijiri, Naka; Tooru Takeura, Odawara; Naoki Koyama, Kokubunji; Masahiro Kitada, Nishitama, all of Japan

[73] Assignee: Hitachi, Ltd., Tokyo, Japan

[21] Appl. No.: 792,630

[22] Filed: Nov. 15, 1991

[30] Foreign Application Priority Data

Nov. 19, 1990 [JP] Japan ................................ 2-311492

[51] Int. Cl.⁵ .............................................. G11B 5/33
[52] U.S. Cl. ...................................... 360/113; 29/603; 156/659.1
[58] Field of Search ................... 360/113; 29/603; 156/659.1

[56] References Cited

U.S. PATENT DOCUMENTS

| | | | |
|---|---|---|---|
| 4,879,619 | 11/1989 | Fontana, Jr. et al. | 360/113 |
| 4,940,511 | 7/1990 | Fontana, Jr. et al. | 29/603 X |
| 5,045,961 | 9/1991 | Kobayashi et al. | 29/603 X |
| 5,059,278 | 10/1991 | Cohen et al. | 156/659.1 X |
| 5,084,957 | 2/1992 | Amin et al. | 29/603 |
| 5,141,623 | 8/1992 | Cohen et al. | 156/659.1 X |

FOREIGN PATENT DOCUMENTS 0290823 11/1988 European Pat. Off. ............ 360/113
60-45922 8/1983 Japan .

OTHER PUBLICATIONS

Digest of 13th Annual Conference on Magnetics in Japan, 1989, pp. 228.

Primary Examiner—John H. Wolff
Attorney, Agent, or Firm—Fay, Sharpe, Beall, Fagan, Minnich & McKee

[57] ABSTRACT

A magnetoresistive head is disclosed. It comprises a lower gap film, a magnetoresistive film, a bias film, an electrode, an upper gap film, and upper shield film provided in sequence on a substrate. A protective film is provided under the upper shield film to prevent the upper gap film and electrode from the undesirable etching during patterning the upper shield film.

9 Claims, 2 Drawing Sheets

FIG. 3 (b)     PRIOR ART

MAGNETORESISTIVE HEAD

BACKGROUND OF THE INVENTION

The present invention relates to a magnetoresistive reproducing head used for playback of magnetic disk apparatuses or magnetic tape apparatuses such as VTRs.

Recent magnetic recording apparatuses have increased recording capacity. To accomplish this, as an example, the magnetic disk apparatus is made to have a track width as narrow as 5–6 μm. As the size of the apparatus decreases, the media velocity also decreases. In order to detect signals recorded in such narrow areas at a high signal-to-noise ratio, magnetoresistive heads have been developed in place of the conventional inductive heads. As an example, the magnetoresistive head is made in a structure shown in FIGS. 3(a) and 3(b) (see, for example, the Japanese Patent Laid-Open 60-45922 and the Digests of 13th Annual Conference on Magnetics in Japan, 1989, pp. 228). The magnetic head shown in these figures are called a shunt bias magnetoresistive head. FIG. 3(a) is a plan view for the head, and FIG. 3(b) is a cross-sectional view taken across line A—A' in FIG. 3(a).

The magnetoresistive head comprises a lower shield film 2, a lower gap film 3, a magnetoresistive film 4, a shunt bias film 5, an electrode 6, an upper gap film 7, and an upper shield film 8 laminated on a non-magnetic substrate 1. In general, all the films except the lower shield film 2 and the upper shield film 8 are made very thin. The magnetoresistive film 4, for example, is a few 10 nm thick, and the lower gap film 3 and the upper gap film 7 are around 0.2 μm.

In order to allow the magnetoresistive head to play back the high density recorded signals with a high signal-to-noise ratio, the magnetoresistive film 4, the upper gap film 7 and the lower gap film 3 are formed very thin. With such thin films, the under film of the film to be etched is undesirably subjected to etching during patterning. In the worst case, the under film may vanish, particularly when the film to be etched is thick relative to the thin under film. In the magnetic head shown in FIGS. 3(a) and 3(b), the problem of undesirable etching of the upper gap film 7 and the electrode 6 formed under the upper gap film 7 occurs in patterning the upper shield film 8.

In general, the thin film formed under the film to be etched for patterning is adversely subjected to etching because of the film thickness distribution and the etching rate distribution within and between the substrates. In particular, the undesirable etching is significant in physical etching methods, such as an ion milling, which have been frequently used in fabricating magnetic heads. As for the magnetoresistive head, as described above, it is formed of very thin films, and the unwanted etching of the under films tends to lower the yield to a great extent.

SUMMARY OF THE INVENTION

In view of the foregoing, an object of the present invention is to provide a magnetoresistive head structure used to reproduce high density recorded signals that can be fabricated with a high yield. A particular object of the present invention is to provide a magnetic head structure that can prevent the under film from being subjected to undesirable etching during the etching of the upper film during patterning.

Briefly, the foregoing objects are accomplished in accordance with aspects of the present invention by forming a protective film under the film to be etched. The protective film should be made thick enough to accomplish the objects in connection with the thickness distribution and the etching rate distribution of the film to be etched.

The present invention will be better understood from the following description taken in connection with the accompanying drawings. FIG. 1(a) is a cross-section of a magnetic head of the present invention, corresponding to the cross-section in FIG. 3(b) taken across A-A' in FIG. 3(a). FIG. 1(b) is a plan view for the magnetic head.

First, as shown in FIGS. 1(a) and 1(b), there is formed on a non-magnetic substrate 1 a lower shield film 2, a lower gap film 3, a magnetoresistive film 4, a shunt bias film 5 for applying a bias magnetic field to the magnetoresistive film 4, an electrode 6 electrically connected with the magnetoresistive film 4, and an upper gap film 7. Then, a protective film 9 is formed as shown. The protective film 9 which is an electrically insulating material does not reach a surface facing a recording medium or air bearing surface 12. The protective film 9 also covers the upper gap film 7 and the electrode 6. In turn, an upper shield film 8 is formed on the protective film 9 and on the portion of the lamination which is on the side of the air bearing surface 12 and which is not covered with the protective film 9. Then, the upper shield film is patterned. An end of the upper shield film 8 opposite to the air bearing surface 12 is formed to reach the protective film 9. Such structure prevents the electrode 6 and the upper gap film 7 from being subjected to etching when the upper shield film 8 is subjected to etching for patterning.

The electrode 6 should be connected to other circuits and it becomes possible by removing a part of the protective film 9. The thickness of the protective film 9 should be determined in connection with the film thickness distribution and etching rate distribution of the upper shield film 8. That is, the protective film 9 should be thicker as the difference of the maximum and minimum film thickness of the portion to be etched of the upper shield film 8 and the difference of the maximum and minimum etching rates of the portion to be etched of the upper shield film 8 are larger. The protective film 9 also should be thicker as the under film of the upper shield film 8 is thinner and the etching rate of the under film is larger. It is practical to make an experiment on a magnetic head of the same structure as the one to be manufactured and to make it have the protective film of a thickness which does not cause adverse etching for the under film.

There is the possibility that the protective film 9 may disappear in etching if its thickness is thinner than 0.1 μm. Even if it is made thicker than 2 μm, it cannot be expected to increase its effect. In general, therefore, the protective film 9 is often made in a range of 0.1 to 2 um thick. It is not always limited in this range as the proper thickness may change depending on the combination of the constituting films. It is usually sufficient to make it 1 μm thick.

The protective film 9 may be made of any of inorganic material such as $Al_2O_3$ or any of organic material such as photoresist or similar materials that can endure processes after forming it, particularly in heat treatment. The heat treatment mentioned above is made in a temperature range of 150 to 300° C. for the magnetic material in a magnetic field and for bonding wires. The inorganic protective film materials available besides $Al_2O_3$ include oxides of Si, nitrides of Si, nitrides of Al, $Al_2O_3$-$Ta_2O_5$ or the like. The organic protective film materials available include novolak resins such as the AZ resist (a trade mark of Hoechst Co.) and the OFPR resist (a trade mark of Tokyo Ohka Kogyo Co., Ltd.) as the photoresist, or polyimide resins such as the PIQ (a trade mark of Hitachi Chemical Co., Ltd.).

As described above, in the magnetoresistive head according to the present invention, there is an etched end 11 formed adjacent the protective film 9 of the upper shield film 8 which is the end thereof on the opposite side to the air bearing surface 12.

The non-magnetic substrate 1 used for the magnetoresistive head shown in FIGS. 1 and 2 according to the present invention is composed of a non-magnetic insulating plate which can endure the heat treatment mentioned above. Alternatively, it can be made of a ferromagnetic materials such as Mn-Zn ferrite or Ni-Zn ferrite. In this case, the lower shield film 2 is not needed.

DETAILED DESCRIPTION OF THE EMBODIMENTS

Figure 1:
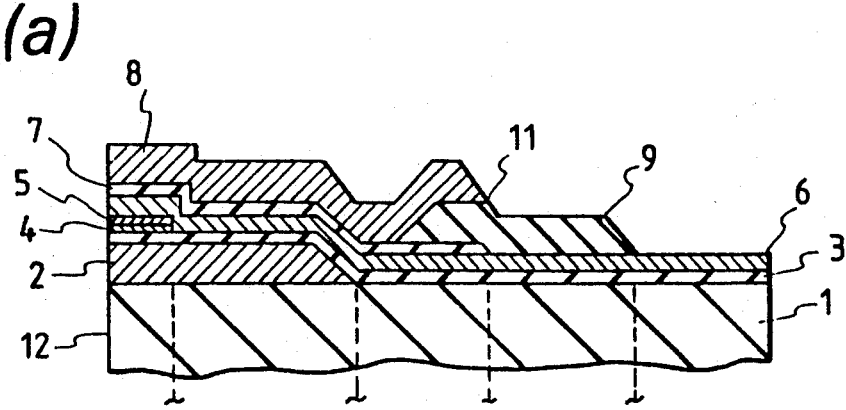
FIG. 1(a) is a cross-sectional view and FIG. 1(b) is a plan view of a shunt bias magnetoresistive head constructed according to an embodiment of the present invention.
Figure 1:
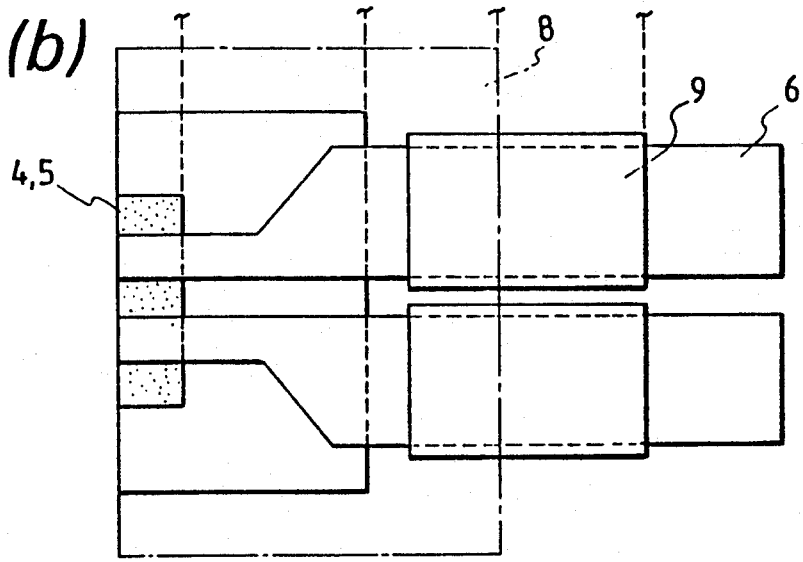

The present invention is illustrated in further detail by reference to the accompanying drawings.

Embodiment 1 of the present invention is described below by referring to FIG. 1. The non-magnetic substrate 1 is an $Al_2O_3$-TiC plate. Firstly, the lower shield film 2 was formed of thin Ni-Fe alloy film on the non-magnetic substrate 1 by a sputtering method to a thickness of 3 μm. Patterning was performed by an ion milling method with the photoresist film as a mask.

Thereafter, the lower gap film 3 is formed of $Al_2O_3$ by the sputtering method to a thickness of 0.19 μm. Formed on the lower gap film 3 is an Ni-Fe alloy film for the magnetoresistive film 4 and Nb film for the shunt bias film 5 which are formed continuously thereon by a vacuum evaporation method to respective thicknesses of 25 nm and 36 nm. Patterning for both films was conducted by an ion milling method with the photoresist film as a mask. In this step of the process, the lower gap film 3 also may be etched, but no problems are caused since the amount of etching is only 2–3 nm. The reason for that is that the magnetoresistive film 4 and the shunt bias film 5 are thin, and the milling rate of $Al_2O_3$ of the lower gap film 3 is slow as compared with both films.

In the next step, the electrode 6 is formed of Cr/Cu/Cr laminated film by a vacuum evaporation method or a sputtering method. The underlayer of Cr serves to increase adhesion to the under film, and the top layer of Cr prevents oxidation of Cu in the process and increases the adhesion as well. Their respective thicknesses are 0.02 μm, 0.4 μm, and 0.02 μm. Patterning, as mentioned above, is conducted by an ion milling method with the photoresist as a mask. In this step of the process, the shunt bias film 5 and the lower gap film 3 are subjected to etching, but the amount of etching is small. The reason for this is that the Cr layer is very thin, and the milling rate for Cu is high as compared with that for the $Al_2O_3$ material of the lower gap film 3 and the Nb material of the shunt bias film 5. The upper gap film 7 is formed of the same $Al_2O_3$ material as the lower gap film 3. Its thickness is 0.15 μm. Patterning, as mentioned above, is performed by the ion milling method with the photoresist as a mask. The patterning for the upper gap film 7 may involve the problem of etching the electrode 6. In this step of the process, electrode 6, which is the under film, has a higher milling rate than the $Al_2O_3$ film which is the upper gap film 7. The time for which the electrode 6 is subjected to the etching is around 10% of the etching time for the upper gap film 7. The electrode 6 is subjected to etching to a depth of about 75 nm as the milling rate ratio of Cu to $Al_2O_3$ was around 5. This causes virtually no adverse effect as the electrode 6 is around 0.4 um thick as described above.

Next, the protective film 9 is formed of photoresist film (OFPR800, a trade name of Tokyo Ohka Kogyo Co., Ltd.). The photoresist film thickness is made to be about 1 μm thick by a coating method. Exposure and developing are made to coat the electrode 6 and a part of the upper gap film 7 with the photoresist film.

As described above, it is sufficient for the present invention that the protective film 9 should be provided over an area in which the portion to be etched of the upper shield film 8 and the electrode 6 overlap. If this condition is met, the extension of the protective film 9 toward the air bearing surface 12 from the etching end 11 of the upper shield film 8 can possibly be made narrow. As a practical matter, given the present level of working accuracy, however, the protective film 9 has to be extended at least 1 μm toward the air bearing surface 12 of the upper shield film 8. The end of the protective film 9 opposite to the air bearing surface 12, as will be described later, is formed in a step that occurs after the upper shield film 8 is made. Then, the protective film 9 is removed to expose the electrode 6.

The distance between the shields, or the distance between the upper shield film 8 and the lower shield film 2 in the vicinity of the magnetoresistive film 4 has to be made as thin as possible in order to obtain high resolution, since the resolution is lowered as the distance is increased. For this reason, the protection film 9 should be formed at the place right above the magnetoresistive film 4.

In the present embodiment, the protective film 9 is not formed or is made so as not to exist in a range of 20 μm from the air bearing surface 12 in a direction perpendicular thereto. The protective film 9 is also made to extend 5 μm toward the air bearing surface 12 from a position corresponding to the etching end 11 of the upper shield film 8. The protective film 9 is further made to extend at least 1 μm from each of the widthwise ends of the electrode 6 parallel to the air bearing surface 12 in order to have enough margin to keep the processing accuracy. The photoresist film of the protective film 9 is heat treated at 250° C. for three hours to endure the following heat treatment.

Next, the NiFe film is formed to 1 μm in thickness over an area within 25 μm from the air bearing surface 12 in the sputtering method to become the upper shield film 8. Needless to say, the lower shield film 2 and the upper shield film 8 should entirely cover over the magnetoresistive film 4. The depth of magnetoresistive film 4 from the air bearing surface 12 in a direction perpendicular to the air bearing surface 12 was preferably made less than 5 μm, and the depth of the lower shield film 2 and the upper shield film 8 are made greater than that.

Patterning of the upper shield film 8 is made by the ion milling method with the photoresist film as a mask. The protective film 9 is subjected to etching during the etching of the upper shield film 8. The period of etching for the protective film 9 is around 10% of the etching time for the upper shield film 8 as in the case described above. The amount of etching for the protective film 9 is around 0.1 μm, since the milling rate of the NiFe film of the upper shield film 8 is virtually the same as the milling rate of the photoresist film of the protective film 9. The initial thickness of the protective film 9 is 1 μm, which is enough to protect the electrode 6 and the upper gap film 7.

Although the protective film 9 is disclosed as being 1 μm thick, it should only protect the electrode 6 and upper gap film 7 against the etching of the upper shield film 8. It may be made approximately 0.1 μm thick at a minimum. It is preferably 0.2 μm or thicker in view of providing an accuracy margin for the process.

Finally, as described above, a part of the protective film 9 is removed to form a through hole for connection of the electrode with external circuits. For this, patterning was is performed by a reactive ion etching method using an oxygen gas with the resist film as a mask. In the present embodiment, the end of the protective film 9 is extended 10 μm from a position corresponding to the etching end 11 in a direction opposite to the air bearing surface 12.

The NiFe alloy used for the magnetoresistive film 4, the upper shield film 8 and the lower shield film 2 in the present embodiment contain 82 wt% Ni.

As described above, the distance between the shield films should be narrow to obtain high resolution and in the present embodiment it is 0.4 μm thick. In general, the distance between the shield films is made to the length of a bit to be recorded. The bit density can be made high as the bit length is short. In the present invention, the distance between the lower shield film 2 and the upper shield film 8 is not limited to any distance. According to the present invention, the distance can be can make it narrower than 0.6 μm, or around 0.3 μm, as desired. In addition, the present invention can avoid the undesirable etching of the under film in the patterning of the upper shield film 8.

So far, a shunt bias magnetoresistive head has been described as the preferred embodiment in the present embodiment. In addition to this, the present invention is effective for the magnetoresistive head of other bias types, such as a soft film bias type, a composite type combining the shunt bias type and the soft film bias type, and the like.

Also, the present invention is similarly effective for a magnetic head having a magnetic domain control film formed at both track widthwise ends of the magnetoresistive film 4. The magnetic domain control film that is available is FeMn antiferromagnetic film or the like.

Figure 2:
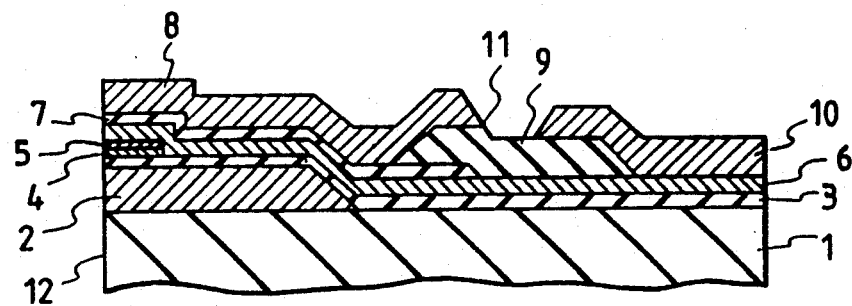
FIG. 2 is a cross-sectional view of a shunt bias magnetoresistive head constructed according to another embodiment of the present invention; and, FIG. 3(a) is a plan view

The invention can be practiced according to a second embodiment of a magnetoresistive heat that reduces head noise and simplifies the production process. Reduction in the head noise can be effectively accomplished by reducing the electrical resistance of the electrode 6. FIG. 2 is a cross-sectional view of a magnetic head constructed according to the second embodiment, corresponding to a cross-sectional view taken across line A—A' in FIG. 3. The present embodiment has a conductor layer 10 formed on the electrode 6 to reduce the electrical resistance of the electrode 6. The conductor layer 10 may be desirably made somewhat larger than the electrode 6. In order to have a margin for the process accuracy and to avoid the appearance of any portions of the electrode 6 uncovered by the conductor layer 10, the conductor layer 10 should be shaped so that the ends of the conductor layer 10 extend at least 1 μm, usually less than 3 μm, out of the end of the electrode 6.

The conductor layer 10 needs no lower thickness limit as it is effective in itself to reduce the resistance as long as it is provided. The upper thickness limit of the conductor layer 10 is around 2 μm. The conductor layer 10 is usually thicker than 2000A as the electrode 6 is often made around 2000 A thick.

It is effective to make the upper shield film 8 also serve as the conductor layer 10. This can reduce the electric resistance without increasing the number of processing steps. In the embodiment 1 described above, the protective film 9 was made to cover the entire surface of the electrode 6 before through holes were formed. In the second embodiment, the inventors form a through hole in the exposure and development steps before they form the conductor layer 10 of the upper shield film 8 so as to cover a part of the protective film 9. That is, this is done to avoid undesirable etching of the upper gap film 7 and electrode 6 during patterning of the conductor layer 10. The etching ends in patterning of the conductor layer 10 and patterning of the upper shield film 8, and each are made to exist on the protective film 9. It is therefore preferable that the protective film 9 extends more than 1 μm from each of the etching ends of the conductor layer 10 on the side of the air bearing surface 12. This is also similar to the patterning of the upper shield film 8 described previously. Such a process not only prevents the electrode 6 and the upper gap film 7 from being etched during the etching step for the upper shield film 8, but also omits the step for forming the through holes on the protective film 9.

Reduction of the electrical resistance of the electrode 6 can also be effectively made by forming a conductor layer under the electrode 6. For example, the lower shield film 2 can be used to form the conductor layer to reduce the electrical resistance without increasing the number of processing steps.

In accordance with the present invention, the electrode 6 and the upper gap film 7 except in the vicinity of the air bearing surface 12 are covered by the protective film 9. This prevents the electrode 6 and upper gap film 7 from being undesirably etched during etching of the thick upper shield film 8. The protection is particularly effective for the thinner electrode 6 and the upper gap film 7. As an example, the yield of the magnetic head having the film thicknesses given in the embodiment 1 was around 30% as it had no protective film, but that of the magnetic head having the protective film according to the present invention was 100%.

The electrode 6 can be reduced around 2 Ω as the upper shield film 8 of 1 um thick was laminated on it. This effect was further increased when the lower shield film 2 was made to also serve as the electrode.

Figure 3:
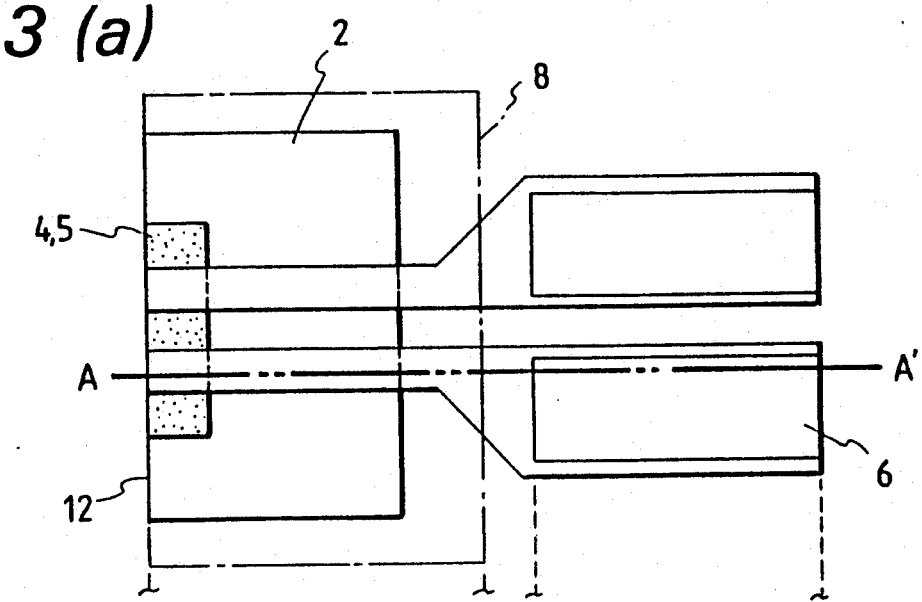
FIG. 3(b) is a cross-sectional view of the conventional shunt bias magnetoresistive head.
Figure 3:
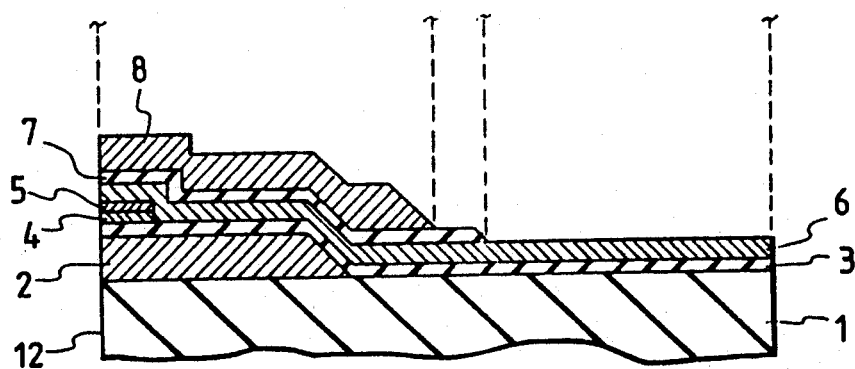

The identical reference numerals in FIGS. 1 to 3 indicate substantially the same portions.

What is claimed is:

1. A magnetoresistive head comprising at least a lower gap film, a magnetoresistive film, a bias film, an electrode, an upper gap film, and upper shield film provided in sequence on a substrate, wherein a protective film is provided to cover at least said upper gap film and said electrode right under ends of said upper shield film on the side opposite to a air bearing surface of said head, and said protective film does not exist right on at least the magnetoresistive film.

2. A magnetoresistive head according to claim 1, wherein said protective film extends at least 1 μm out of right under the end of said upper shield film on the side opposite to the air bearing surface, toward the both sides.

3. A magnetoresistive head according to claim 1, wherein said protective film is formed of at least one material selected from the group consisting of oxides of Al, nitrides of Al, oxides of Si, nitrides of Si, Al$_2$O$_3$-Ta$_2$O$_5$, photoresist having novolak resin as base, and polyimide resins.

4. A magnetoresistive head according to claim 1, wherein said protective film is made 0.1 to 2 μm thick.

5. A magnetoresistive head according to claim 1, wherein said substrate used is a non-magnetic substrate, and a lower shield film is provided between said non-magnetic substrate and said lower gap film.

6. A magnetoresistive head according to claim 1, wherein an electric conductor layer is laminated on said electrode, and a part of said conductor layer is formed on said protective film.

7. A magnetoresistive head according to claim 6, wherein at least a part of said electric conductor layer is formed of the same material as said upper shield film.

8. A magnetoresistive head according to claim 6, wherein said protective film is formed of at least one material selected from the group consisting of oxides of Al, nitrides of Al, oxides of Si, nitrides of Si, Al$_2$O$_3$-Ta$_2$O$_5$, photoresist having novolak resin as base, and polyimide resins.

9. A magnetoresistive head according to claim 6, wherein said protective film extends at least 1 μm out of right under the end of said upper shield film on the side opposite to the air bearing surface, toward the both sides.

* * * * *